US012785099B2

(12) United States Patent
Wang et al.

(10) Patent No.: US 12,785,099 B2
(45) Date of Patent: Nov. 3, 2026

(54) NEGATIVE ACTIVE MATERIAL, ELECTROCHEMICAL DEVICE THAT USES SAME, AND ELECTRONIC DEVICE

(71) Applicant: Ningde Amperex Technology Limited, Fujian (CN)

(72) Inventors: Shuo Wang, Ningde (CN); Jiali Dong, Ningde (CN); Jia Tang, Ningde (CN); Yuansen Xie, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 678 days.

(21) Appl. No.: 18/188,686

(22) Filed: Mar. 23, 2023

(65) Prior Publication Data

US 2023/0223538 A1 Jul. 13, 2023

Related U.S. Application Data

(63) Continuation of application No. PCT/CN2020/127812, filed on Nov. 10, 2020.

(51) Int. Cl.

*H01M 4/133* (2010.01)
*H01M 4/587* (2010.01)
*H01M 10/0525* (2010.01)
*H01M 4/02* (2006.01)

(52) U.S. Cl.

CPC ........... *H01M 4/587* (2013.01); *H01M 4/133* (2013.01); *H01M 10/0525* (2013.01); *H01M 2004/021* (2013.01); *H01M 2004/027* (2013.01)

(58) Field of Classification Search

CPC .. H01M 4/133; H01M 4/587; H01M 10/0525; H01M 2004/021; H01M 2004/027

See application file for complete search history.

(56) References Cited

U.S. PATENT DOCUMENTS

| | | | | |
|---|---|---|---|---|
| 2012/0258366 | A1 | 10/2012 | Yu et al. | |
| 2019/0363348 | A1 * | 11/2019 | Kurita | H01M 4/386 |
| 2020/0052292 | A1 * | 2/2020 | Salem | H01M 4/625 |

FOREIGN PATENT DOCUMENTS

| | | | |
|---|---|---|---|
| CN | 101053098 | A | 10/2007 |
| CN | 101460279 | A | 6/2009 |
| CN | 102148355 | A | 8/2011 |
| CN | 102779991 | A | 11/2012 |
| CN | 104205432 | A | 12/2014 |
| CN | 105358485 | A | 2/2016 |
| CN | 104205432 | B | 8/2016 |

(Continued)

OTHER PUBLICATIONS

International Search Report issued on May 26, 2021 in corresponding application No. PCT/CN2020/127812; 6 pgs.

(Continued)

*Primary Examiner* — Osei K Amponsah

(74) *Attorney, Agent, or Firm* — Maier & Maier, PLLC

(57) ABSTRACT

A negative active material having a surface mean diameter of the negative active material satisfying: lg(SMD−2)+lg(SMD+2)≥0.4. SMD is a value of the surface mean diameter of the negative active material measured in μm, and falls within a range of 10 to 16; and lg is a frequency. The negative active material enables the electrochemical device to achieve a trade-off between a high energy density and a low degree of lithium plating.

11 Claims, 1 Drawing Sheet

(56) References Cited

FOREIGN PATENT DOCUMENTS

| | | | |
|---|---|---|---|
| CN | 107112536 | A | 8/2017 |
| CN | 106992278 | B | 7/2018 |
| CN | 111370695 | A | 7/2020 |
| EP | 3591747 | A1 | 1/2020 |
| JP | 2018022656 | A | 2/2018 |
| KR | 1020160012141 | A | 2/2015 |
| WO | 2004056703 | A1 | 7/2004 |

OTHER PUBLICATIONS

Chinese Office Action issued on Jun. 17, 2022, in corresponding application No. 202080020265.1, 9 pgs.
Supplementary Search Report issued on Jan. 8, 2024, in corresponding European Application No. 20961016.1, 2 pages.
Office Action issued on Jun. 27, 2024, in corresponding Indian Application No. 202327030659, 5 pages.

* cited by examiner

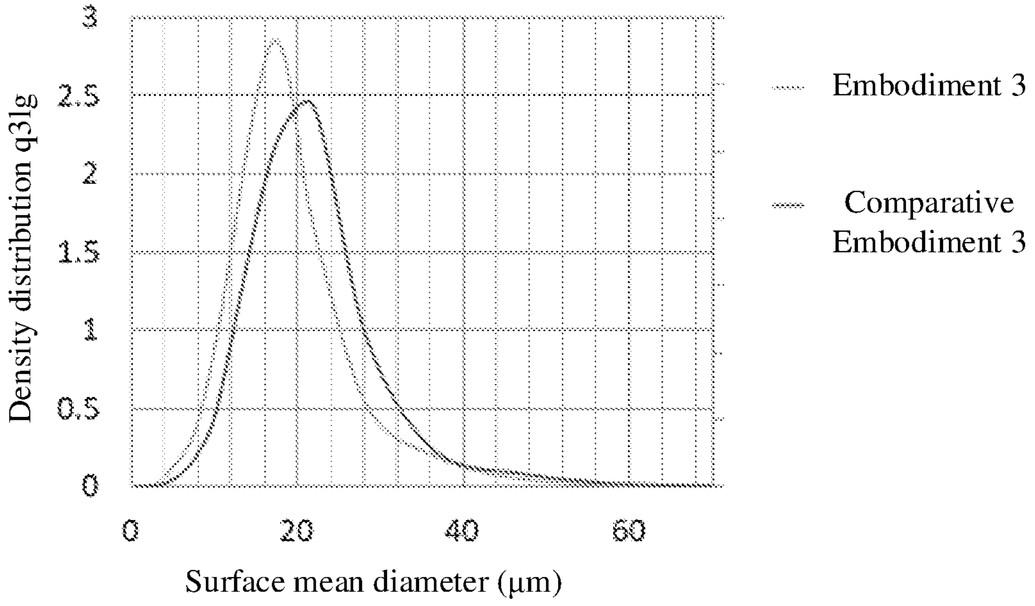
3
2.5
2
1.5
1
0.5
0
0
20
40
60
Density distribution q3lg
Surface mean diameter (μm)
Embodiment 3
Comparative Embodiment 3

NEGATIVE ACTIVE MATERIAL, ELECTROCHEMICAL DEVICE THAT USES SAME, AND ELECTRONIC DEVICE

CROSS REFERENCE TO RELATED APPLICATIONS

This application is a continuation application of International Application No. PCT/CN2020/127812, filed on Nov. 10, 2020, the contents of which are incorporated herein by reference in its entirety.

TECHNICAL FIELD

This application relates to the field of energy storage, and in particular, to a negative active material, an electrochemical device that uses same, and an electronic device.

BACKGROUND

Electrochemical devices (such as a lithium-ion battery) are widely used by virtue of advantages such as environmental friendliness, a high working voltage, a high specific capacity, and a long cycle life, and have become the most promising new green chemical power source in the world today. A small-sized lithium-ion battery is usually used as a power supply for a portable electronic communications device (for example, a portable camcorder, a mobile phone, or a notebook computer), especially for a high-performance portable device. A medium-sized and large-sized lithium-ion battery characterized by a high output voltage has been developed for use in an electric vehicle (EV) and a large-scale energy storage system (ESS). A key technical issue to be solved urgently that accompanies the wide application of the lithium-ion battery is to increase an energy density and suppressing lithium plating of the battery. Improving an active material in an electrode plate is one of approaches to solving such issue.

In view of this, it is necessary to provide an improved well-performing negative active material, an electrochemical device that uses same, and an electronic device.

SUMMARY

Embodiments of this application provide a negative active material, an electrochemical device that uses same, and an electronic device to solve at least one problem in the related art to at least some extent.

According to an aspect of this application, this application provides a negative active material. A surface mean diameter of the negative active material satisfies: lg(SMD−2)+lg(SMD+2)≥0.4, where SMD is a value of the surface mean diameter of the negative active material in μm, and falls within a range of 10 to 16; and lg is frequency.

In some embodiments, the surface mean diameter of the negative active material satisfies: lg(SMD−2)+lg(SMD+2)≥0.5. In some embodiments, the surface mean diameter of the negative active material satisfies: lg(SMD−2)+lg(SMD+2)≤1.0. In some embodiments, the surface mean diameter of the negative active material satisfies: lg(SMD−2)+lg(SMD+2)≤0.8. In some embodiments, the surface mean diameter of the negative active material satisfies: lg(SMD−2)+lg(SMD+2)≤0.6.

In some embodiments, the surface mean diameter SMD of the negative active material falls within a range of 12 μm to 14 μm. In some embodiments, the surface mean diameter SMD of the negative active material is 10 μm, 11 μm, 12 μm, 13 μm, 14 μm, 15 μm, or 16 μm, or falls within a range formed by any two thereof.

According to an embodiment of this application, a volume-specific surface area Sv of the negative active material is less than or equal to 0.3 $m^2/cm^3$. In some embodiments, the volume-specific surface area Sv of the negative active material is less than or equal to 0.2 $m^2/cm^3$. In some embodiments, the volume-specific surface area Sv of the negative active material is less than or equal to 0.01 $m^2/cm^3$. In some embodiments, the volume-specific surface area Sv of the negative active material is less than or equal to 0.05 $m^2/cm^3$. In some embodiments, the volume-specific surface area Sv of the negative active material is greater than or equal to 0.1 $m^2/cm^3$. In some embodiments, the volume-specific surface area Sv of the negative active material is 0.1 $m^2/cm^3$, 0.2 $m^2/cm^3$, or 0.3 $m^2/cm^3$, or falls within a range formed by any two thereof.

According to another aspect of this application, this application provides an electrochemical device, including a positive electrode, an electrolytic solution, and a negative electrode. The negative electrode includes a negative active material layer. The negative active material layer includes the negative active material according to this application.

According to an embodiment of this application, an areal density of the negative active material layer is 0.077 $mg/mm^2$ to 0.121 $mg/mm^2$. In some embodiments, the areal density of the negative active material layer is 0.080 $mg/mm^2$ to 0.120 $mg/mm^2$. In some embodiments, the areal density of the negative active material layer is 0.085 $mg/mm^2$ to 0.110 $mg/mm^2$. In some embodiments, the areal density of the negative active material layer is 0.090 $mg/mm^2$ to 0.100 $mg/mm^2$. In some embodiments, the areal density of the negative active material layer is 0.077 $mg/mm^2$, 0.080 $mg/mm^2$, 0.085 $mg/mm^2$, 0.090 $mg/mm^2$, 0.095 $mg/mm^2$, 0.100 $mg/mm^2$, 0.105 $mg/mm^2$, 0.110 $mg/mm^2$, 0.115 $mg/mm^2$, 0.120 $mg/mm^2$, or 0.121 $mg/mm^2$, or falls within a range formed by any two thereof.

According to an embodiment of this application, when the electrochemical device is in a state of 50% SOC, a compacted density of the negative electrode is 1.20 $g/cm^3$ to 1.83 $g/cm^3$. In some embodiments, when the electrochemical device is in a state of 50% SOC, the compacted density of the negative active material layer is 1.30 $g/cm^3$ to 1.80 $g/cm^3$. In some embodiments, when the electrochemical device is in a state of 50% SOC, the compacted density of the negative active material layer is 1.40 $g/cm^3$ to 1.60 $g/cm^3$. In some embodiments, when the electrochemical device is in a state of 50% SOC, the compacted density of the negative active material layer is 1.20 $g/cm^3$, 1.30 $g/cm^3$, 1.40 $g/cm^3$, 1.50 $g/cm^3$, 1.60 $g/cm^3$, 1.70 $g/cm^3$, 1.80 $g/cm^3$, or 1.83 $g/cm^3$, or falls within a range formed by any two thereof.

According to an embodiment of this application, as measured by an X-ray diffraction pattern, a ratio C004/C110 is within a range of 5 to 15, C004 is a peak area of a (004) surface of the negative active material layer, C110 is a peak area of a (110) surface of the negative active material layer. In some embodiments, as measured by the X-ray diffraction pattern, the C004/C110 ratio of the negative active material layer falls within a range of 6 to 12. In some embodiments, as measured by the X-ray diffraction pattern, the C004/C110 ratio of the negative active material layer falls within a range of 8 to 10. In some embodiments, as measured by the X-ray diffraction pattern, the C004/C110 ratio of the negative active material layer is 5, 6, 7, 8, 9, 10, 11, 12, 13, 14, or 15, or falls within a range formed by any two thereof.

According to an embodiment of this application, a bonding force between the negative active material layer and the negative current collector is 8 N/m to 14 N/m. In some embodiments, the bonding force between the negative active material layer and the negative current collector is 10 N/m to 12 N/m. The bonding force between the negative active material layer and the negative current collector is 8 N/m, 9 N/m, 10 N/m, 11 N/m, 12 N/m, 13 N/m, or 14 N/m, or falls within a range formed by any two thereof.

According to an embodiment of this application, a porosity of the negative active material layer is 20% to 40%. In some embodiments, the porosity of the negative active material layer is 25% to 35%. In some embodiments, the porosity of the negative active material layer is 28% to 32%. In some embodiments, the porosity of the negative active material layer is 20%, 22%, 25%, 28%, 30%, 32%, 35%, 38%, or 40%, or falls within a range formed by any two thereof.

According to an embodiment of this application, the electrochemical device satisfies the following relationship as measured in a charge and discharge test:

$$D10/D1 \geq 95\ \%\text{; and}$$

$$(C1 - D10)/C1 \leq 7\ \%$$

where the charge and discharge test is performed according to the following steps:

(a) charging the electrochemical device at a direct current of 3C until a 100% state of charge, and recording a charge capacity;

(b) after step (a), discharging the electrochemical device at a direct current of 1C until a voltage of 3 V, recording a discharge capacity, and staying for 5 minutes;

(c) after step (b), discharging the electrochemical device at a direct current of 0.5C until the voltage of 3 V, recording a discharge capacity, and staying for 5 minutes;

(d) after step (c), discharging the electrochemical device at a direct current of 0.05C until the voltage of 3 V, recording a discharge capacity, and staying for 5 minutes;

(e) after step (d), discharging the electrochemical device at a direct current of 0.005C until the voltage of 3 V, recording a discharge capacity, and staying for 5 minutes; and (f) repeating steps (a) to (e) 10 times;

C1 is a capacity of the electrochemical device after step (a) in a $1^{st}$ charge and discharge test;

D1 is a sum of capacities of the electrochemical device after steps (b), (c), (d), and (e) in the $1^{st}$ charge and discharge test; and D10 is a sum of capacities of the electrochemical device after steps (b), (c), (d), and (e) in a $10^{th}$ charge and discharge test.

According to an aspect of this application, this application provides an electronic device, including the electrochemical device according to this application.

Additional aspects and advantages of this application will be described or illustrated in part later herein or expounded through implementation of the embodiments of this application.

BRIEF DESCRIPTION OF DRAWINGS

For ease of describing the embodiments of this application, the following outlines the drawings required for describing the embodiments of this application. Evidently, the drawings outlined below are merely a part of embodiments in this application. Without making any creative efforts, a person skilled in the art can still obtain the drawings of other embodiments according to the results illustrated in these drawings.

FIG. 1 shows a curve of a surface mean diameter and density distribution of a negative active material used in Embodiment 3 and Comparative Embodiment 3 of this application.

DETAILED DESCRIPTION

Embodiments of this application will be described in detail below. In the specification of this application, identical or similar components and the components having identical or similar functions are represented by similar reference numerals. The embodiments described herein with reference to the accompanying drawings are illustrative and graphical in nature, and are intended to enable a basic understanding of this application. The embodiments of this application are not to be construed as a limitation on this application.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

Wide application of electrochemical devices (such as a lithium-ion battery) is accompanied with higher requirements on performance of such devices. Energy density, cycle performance, and rate performance are important indicators of performance of lithium-ion batteries. So far, no effective means has been developed to achieve a trade-off between an energy density and a degree of lithium plating of a lithium-ion battery.

This application solves such an issue by optimizing a negative active material. Specifically, this application provides a negative active material. A surface mean diameter of the negative active material satisfies: lg(SMD−2)+lg(SMD+2)≥0.4, where SMD is the surface mean diameter of the negative active material, and falls within a range of 10 μm to 16 μm; and lg is frequency. lg(SMD−2)+lg(SMD+2) indicates a percentage of the quantity of particles with a surface mean diameter being SMD in a total quantity of particles. When lg(SMD−2)+lg(SMD+2)≥0.4, the quantity of particles with a surface mean diameter being SMD is greater than or equal to 40% of the total quantity of particles.

In some embodiments, the surface mean diameter of the negative active material satisfies: lg(SMD−2)+lg(SMD+2)≥0.5. In some embodiments, the surface mean diameter of the negative active material satisfies: lg(SMD−2)+lg(SMD+2)≤1.0. In some embodiments, the surface mean diameter of the negative active material satisfies: lg(SMD−2)+lg(SMD+2)≤0.8. In some embodiments, the surface mean diameter of the negative active material satisfies: lg(SMD−2)+lg(SMD+2)≤0.6.

In some embodiments, the surface mean diameter SMD of the negative active material falls within a range of 12 μm to 14 μm. In some embodiments, the surface mean diameter SMD of the negative active material is 10 μm, 11 μm, 12 μm, 13 μm, 14 μm, 15 μm, or 16 μm, or falls within a range formed by any two thereof.

The "surface mean diameter" of the negative active material means a ratio of a total volume of all negative active material particles to a total area of all the negative active material particles, that is:

$$SMD = \frac{\sum N_i D_i^3}{\sum N_i D_i^2}$$

where i represents an ordinal number, D represents a diameter of a corresponding negative active material particle, and $N_i$ represents the quantity of particles with a diameter of $D_i$.

The surface mean diameter of the negative active material can reflect the size of negative active material particles, and is crucial to diffusion of lithium ions. When the negative active material particles are relatively large, a diffusion path of the lithium ions is relatively long and a transmission speed is relatively low, so that a part of the lithium ions are unable to be quickly intercalated into the negative active material and thereby accumulated on a surface of the negative active material. When an electrical potential is less than 0 V, the lithium ions are precipitated as lithium metal, resulting in lithium plating. When the negative active material particles are relatively small, the lithium ions can diffuse rapidly in the negative active material, but the negative active material exposes relatively many active sites, thereby increasing the content of irreversible lithium, reducing an initial coulombic efficiency of the lithium-ion battery, and reducing the energy density of the lithium-ion battery.

lg(SMD−2)+lg(SMD+2) can reflect particle size distribution of the negative active material. The more the particle size distribution of the negative active material is concentrated, the lower the content of large-sized particles, and the higher the porosity of the negative active material layer under a given compacted density. This helps to diffuse the lithium ions in the negative active material layer and decreases a direct-current resistance of the electrochemical device, and therefore, suppresses the lithium plating of the electrochemical device. When the particle size distribution of the negative active material reaches a threshold, further increase of the particle size distribution of the negative active material can hardly further suppress the lithium plating of the lithium-ion battery significantly, but increases cost.

When the surface mean diameter SMD of the negative active material meets the foregoing relationship and falls within the foregoing range, the negative active material particles are appropriate in size and concentrated in distribution, so that the electrochemical device possesses a high volumetric energy density but without lithium plating and achieves a trade-off of overall performance.

According to an embodiment of this application, a volume-specific surface area Sv of the negative active material is less than or equal to 0.3 $m^2/cm^3$. In some embodiments, the volume-specific surface area Sv of the negative active material is less than or equal to 0.2 $m^2/cm^3$. In some embodiments, the volume-specific surface area Sv of the negative active material is less than or equal to 0.01 $m^2/cm^3$. In some embodiments, the volume-specific surface area Sv of the negative active material is greater than or equal to 0.05 $m^2/cm^3$. In some embodiments, the volume-specific surface area Sv of the negative active material is greater than or equal to 0.1 $m^2/cm^3$. In some embodiments, the volume-specific surface area Sv of the negative active material is 0.1 $m^2/cm^3$, 0.2 $m^2/cm^3$, or 0.3 $m^2/cm^3$, or falls within a range formed by any two thereof.

The "volume-specific surface area" of the negative active material means a ratio of a total surface area to a total volume of the negative active material particles, that is:

$$S_v = \frac{\sum(6nd^2)}{\sum(nd^3)}$$

where n represents the quantity of the negative active material particles, and d represents a diameter of the negative active material particles.

The smaller the volume-specific surface area Sv of the negative active material, the more spherical the negative active material particles. Graphite is used as an example of the negative active material. Graphite is a hexagonal layered structure. Carbon atoms in the same layer form covalent bonds by means of $sp^2$ hybridization. Each carbon atom is connected to three other atoms by using three covalent bonds. Lithium ions are intercalated between graphite layers. When a graphite particle is in flat shape, there are few layers in the graphite particle, and each layer is relatively long. When a graphite particle is quasi-spherical, each layer in the graphite particle is relatively short, thereby facilitating rapid deintercalation of the lithium ions, reducing the direct-current resistance of the lithium-ion battery, and suppressing the lithium plating of the lithium-ion battery. When the volume-specific surface area of the negative active material falls within the foregoing range, the degree of lithium plating can be further traded off with the energy density of the lithium-ion battery.

The surface mean diameter and the volume-specific surface area of the negative active material may be obtained by dynamic particle image analysis. Specifically, the surface mean diameter of the negative active material may be obtained according to the following method: operating a Simpatec QICPIC dynamic particle image analyzer, placing a to-be-tested sample of the negative active material into a powerful dry dispersion unit, dispersing the sample into individual particles thoroughly, and obtaining a clearly edged image of the particle in an exposure time of less than 1 nanosecond by using a high-frequency pulsed light source; obtaining 450 images per second through a high-speed imaging system; and analyzing left and right images to obtain the surface mean diameter and the volume-specific surface area of the negative active material.

This application further provides an electrochemical device, including a positive electrode, a negative electrode, a separator, and an electrolytic solution. The following describes the positive electrode, the negative electrode, the separator, and the electrolyte that are applicable to this application.

Negative Electrode

A negative electrode applicable to an electrochemical device according to this application includes a negative current collector and a negative active material layer. The negative active material layer includes a negative active material according to this application.

According to an embodiment of this application, an areal density of the negative active material layer is 0.077

$mg/mm^2$ to 0.121 $mg/mm^2$. In some embodiments, the areal density of the negative active material layer is 0.080 $mg/mm^2$ to 0.120 $mg/mm^2$. In some embodiments, the areal density of the negative active material layer is 0.085 $mg/mm^2$ to 0.110 $mg/mm^2$. In some embodiments, the areal density of the negative active material layer is 0.090 $mg/mm^2$ to 0.100 $mg/mm^2$. In some embodiments, the areal density of the negative active material layer is 0.077 $mg/mm^2$, 0.080 $mg/mm^2$, 0.085 $mg/mm^2$, 0.090 $mg/mm^2$, 0.095 $mg/mm^2$, 0.100 $mg/mm^2$, 0.105 $mg/mm^2$, 0.110 $mg/mm^2$, 0.115 $mg/mm^2$, 0.120 $mg/mm^2$, or 0.121 $mg/mm^2$, or falls within a range formed by any two thereof. The areal density of the negative active material layer may be measured according to the following method: punching a region coated with an active material layer on both sides of the negative current collector into 12 small discs by using a punching machine, where each disc covers an area of S and is called a negative electrode plate; weighing the negative electrode plates to obtain an average mass m1 of the negative electrode plates; punching the negative current collector stripped of the negative active material layer into 12 small discs by using the punching machine, where each disc covers the same area as the foregoing negative electrode plate; and weighing the small discs to obtain an average mass m2 of the small discs of the negative current collector. The mass of a single negative active material layer in the region of each small disc is (m1−m2)/2, and the areal density of the negative electrode plate is (m1−m2)/2S.

According to an embodiment of this application, when the electrochemical device is in a state of 50% SOC, a compacted density of the negative active material layer is 1.20 $g/cm^3$ to 1.83 $g/cm^3$. In some embodiments, when the electrochemical device is in a 50% SOC state, the compacted density of the negative active material layer is 1.30 $g/cm^3$ to 1.80 $g/cm^3$. In some embodiments, when the electrochemical device is in a state of 50% SOC, the compacted density of the negative active material layer is 1.40 $g/cm^3$ to 1.60 $g/cm^3$. In some embodiments, when the electrochemical device is in a state of 50% SOC, the compacted density of the negative active material layer is 1.20 $g/cm^3$, 1.30 $g/cm^3$, 1.40 $g/cm^3$, 1.50 $g/cm^3$, 1.60 $g/cm^3$, 1.70 $g/cm^3$, 1.80 $g/cm^3$, or 1.83 $g/cm^3$, or falls within a range formed by any two thereof. The compacted density of the negative active material layer may be measured according to the following test method: punching a region coated with the active material layer on both sides of the negative current collector into 12 small discs by using a punching machine, where each disc covers an area of S and is called a negative electrode plate; measuring the thickness of the negative positive plates with a micrometer and recording an average value of the thickness as L1; weighing the negative electrode plates to obtain an average mass m1 of the negative electrode plates; punching the negative current collector stripped of the negative active material layer into 12 small discs by using the punching machine, where each disc covers the same area as the foregoing negative electrode plate; measuring the thickness of the negative current collector with a micrometer and recording an average value of the thickness as L2; and weighing the small discs of the negative current collector to obtain an average mass m2 of the small discs. The mass of a single negative active material layer is (m1−m2)/2, the thickness of a single negative active material layer is (L1−L0)/2, and the compacted density of the negative electrode plates is (m1−m2)/S×(L1−L0).

According to an embodiment of this application, as measured by an X-ray diffraction pattern, a ratio C004/C110 of a peak area C004 of a (004) surface to a peak area C110 of a (110) surface of the negative active material layer is within a range of 5 to 15. In some embodiments, as measured by the X-ray diffraction pattern, the C004/C110 ratio of the negative active material layer falls within a range of 6 to 12. In some embodiments, as measured by the X-ray diffraction pattern, the C004/C110 ratio of the negative active material layer falls within a range of 8 to 10. In some embodiments, as measured by the X-ray diffraction pattern, the C004/C110 ratio of the negative active material layer is 5, 6, 7, 8, 9, 10, 11, 12, 13, 14, or 15, or falls within a range formed by any two thereof. The C004/C110 ratio represents the degree of orientation of the negative active material layer. The higher the C004/C110 ratio, the more anisotropic the negative active material layer. The lower the C004/C110 ratio, the more isotropic the negative active material layer.

The degree of orientation of the negative active material layer may be measured according to *Determination Method of Artificial Graphite Lattice Parameters*, JB/T 4220-2011, a machinery industry standard of the People's Republic of China. Specifically, test conditions are as follows: the X-ray is implemented by $CuK_\alpha$ radiation, and the $CuK_\alpha$ radiation is removed by a filter or a monochromator. A working voltage of an X-ray tube is 30 Kv to 35 Kv, and a working current of the X-ray tube is 15 mA to 20 mA. A scanning speed of a counter is $1/4^{(\circ)}$/min. In recording a diffraction line pattern of the 004 surface, a scanning range of a diffraction angle 2θ is 53° to 57°. In recording a diffraction line pattern of the 110 surface, a scanning range of a diffraction angle 2θ is 75° to 79°. A peak area of the negative active material layer obtained from the diffraction line pattern of the (004) surface is recorded as C004. A peak area of the negative active material layer obtained from the diffraction line pattern of the (110) surface is recorded as C110. A calculated ratio of C004 to C110 of the negative active material layer is the degree of orientation of the negative active material layer.

According to an embodiment of this application, a bonding force between the negative active material layer and the negative current collector is 8 N/m to 14 N/m. In some embodiments, the bonding force between the negative active material layer and the negative current collector is 10 N/m to 12 N/m. The bonding force between the negative active material layer and the negative current collector is 8 N/m, 9 N/m, 10 N/m, 11 N/m, 12 N/m, 13 N/m, or 14 N/m, or falls within a range formed by any two thereof.

The bonding force between the negative active material layer and the negative current collector may be obtained in a tensile test. The test method is: testing the bonding between the negative active material layer and the negative current collector by using an Instron tester (model: 33652), specifically, taking an electrode plate that is 15 mm to 20 mm in length, fixing the electrode plate onto a steel sheet by using a 3M double-sided tape, sticking the tape on the surface of the negative active material layer, connecting one end of the double-sided tape to a paper tape whose width is equal to that of the double-sided tape, adjusting a stopper of a tensile tester to an appropriate position, folding the paper tape upward, and sliding the paper tape for 40 mm at a sliding speed of 50 mm/min; and testing the bonding force between the negative active material layer and the negative current collector at an angle of 180° (that is, pulling in an opposite direction).

According to an embodiment of this application, a porosity of the negative active material layer is 20% to 40%. In some embodiments, the porosity of the negative active material layer is 25% to 35%. In some embodiments, the porosity of the negative active material layer is 28% to 32%.

In some embodiments, the porosity of the negative active material layer is 20%, 22%, 25%, 28%, 30%, 32%, 35%, 38%, or 40%, or falls within a range formed by any two thereof. The higher the porosity of the negative active material layer, the more easily the lithium ions are diffused in the negative active material layer.

The porosity of the negative active material layer may be measured according to the standard of *Iron ores—Determination of Apparent Density, True Density And Porosity, GB/T*24586-2009.

When the compacted density of the negative active material layer is relatively high, a bulk density of the negative active material is higher, thereby making it difficult for the electrolyte to infiltrate the negative active material layer. This is adverse to diffusion of the lithium ions in a direction perpendicular to the negative electrode, and aggravates lithium plating of the lithium-ion battery. When the compacted density of the negative active material is relatively low, an energy density of the lithium-ion battery decreases. When the areal density of the negative active material layer is constant, decrease of the compacted density of the negative active material layer reduces the anisotropy and porosity of the negative active material layer, and reduces the bonding force between the negative active material layer and the negative current collector. When the compacted density of the negative active material layer is constant, decrease of the areal density of the negative active material layer increases the anisotropy of the negative active material layer, reduces the porosity of the negative active material layer, and reduces the bonding force between the negative active material layer and the negative current collector. When falling in the foregoing ranges, the areal density, the compacted density, the degree of orientation C004/C110, and the porosity of the negative active material layer and/or the bonding force between the negative active material layer and the negative current collector help to achieve a better trade-off between the energy density and the degree of lithium plating of the lithium-ion battery.

According to an embodiment of this application, the electrochemical device satisfies the following relationship as measured in a charge and discharge test:

$$D10/D1 \geq 95\ \%;\ \text{and}$$

$$(C1 - D10)/C1 \leq 7\ \%$$

where the charge and discharge test is performed according to the following steps:

(a) charging the electrochemical device at a direct current of 3C until a 100% state of charge, and recording a charge capacity;

(b) after step (a), discharging the electrochemical device at a direct current of 1C until a voltage of 3 V, recording a discharge capacity, and staying for 5 minutes;

(c) after step (b), discharging the electrochemical device at a direct current of 0.5C until the voltage of 3 V, recording a discharge capacity, and staying for 5 minutes;

(d) after step (c), discharging the electrochemical device at a direct current of 0.05C until the voltage of 3 V, recording a discharge capacity, and staying for 5 minutes;

(e) after step (d), discharging the electrochemical device at a direct current of 0.005C until the voltage of 3 V, recording a discharge capacity, and staying for 5 minutes; and (f) repeating steps (a) to (e) 10 times;

C1 is a capacity of the electrochemical device after step (a) in a $1^{st}$ charge and discharge test;

D1 is a sum of capacities of the electrochemical device after steps (b), (c), (d), and (e) in the $1^{st}$ charge and discharge test; and D10 is a sum of capacities of the electrochemical device after steps (b), (c), (d), and (e) in a $10^{th}$ charge and discharge test.

D10/D1 and (C1−D10)/C1 represents the degree of lithium plating of the electrochemical device. When D10/D1 and (C1−D10)/C1 fall within the foregoing ranges, the electrochemical device is free from lithium plating during cycling.

The negative current collector used in this application may be selected from a copper foil, a nickel foil, a stainless steel foil, a titanium foil, foamed nickel, foamed copper, a polymer substrate coated with a conductive metal, or any combination thereof.

According to an embodiment of this application, the negative electrode further includes a conductive layer. In some implementation solutions, a conductive material of the conductive layer may include any conductive material that does not cause a chemical change. Examples of the conductive material include but are not limited to: a carbon-based material (for example, natural graphite, artificial graphite, carbon black, acetylene black, Ketjen black, carbon fiber, carbon nanotubes, and graphene), a metal-based material (for example, metal powder, metal fiber, including copper, nickel, aluminum, silver, and the like), a conductive polymer (for example, a polyphenylene derivative), and any mixture thereof.

According to an embodiment of this application, the negative electrode further includes a binder. The binder is at least one selected from: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, or the like.

Positive Electrode

The positive electrode includes a positive current collector and a positive active material disposed on the positive current collector. Specific types of the positive active material are not limited, and may be selected according to needs.

In some implementation solutions, the positive active material includes a positive electrode material capable of absorbing and releasing lithium (Li). Examples of the positive electrode material capable of absorbing or releasing lithium (Li) may include lithium cobalt oxide, lithium nickel cobalt manganese oxide, lithium nickel cobalt aluminum oxide, lithium manganese oxide, lithium iron manganese phosphate, lithium vanadium phosphate, lithium vanadyl phosphate, lithium iron phosphate, lithium titanium oxide, and a lithium-rich manganese-based materials.

Specifically, the chemical formula of the lithium cobalt oxide may be chemical formula 1:

$$Li_xCo_aM1_bO_{2-c}$$

where M1 is at least one selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and values of x, a, b, and c are in the following ranges: $0.8 \le x \le 1.2$, $0.8 \le a \le 1$, $0 \le b \le 0.2$, $-0.1 \le c \le 0.2$, respectively.

The chemical formula of lithium nickel cobalt manganese oxide or lithium nickel cobalt aluminum oxide may be chemical formula 2:

Chemical formula 2

$$Li_yNi_dM2_eO_{2-f}$$

where M2 is at least one selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and values of y, d, e, and f are in the following ranges: $0.8 \le y \le 1.2$, $0.3 \le d \le 0.98$, $0.02 \le e \le 0.7$, $-0.1 \le f \le 0.2$, respectively.

The chemical formula of the lithium manganese oxide may be chemical formula 3:

Chemical formula 3

$$Li_zMn_{2-g}M3_gO_{4-h}$$

where M3 is at least one selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and values of z, g, and h are in the following ranges: $0.8 \le z \le 1.2$, $0 \le g \le 1.0$, and $-0.2 \le h \le 0.2$, respectively.

In some embodiments, the weight of the positive active material layer is 1.5 to 15 times the weight of the negative active material layer. In some embodiments, the weight of the positive active material layer is 3 to 10 times the weight of the negative active material layer. In some embodiments, the weight of the positive active material layer is 5 to 8 times the weight of the negative active material layer. In some embodiments, the weight of the positive active material layer is 1.5, 2, 3, 4, 5, 6, 7, 8, 9, 10, 11, 12, 13, 14, or 15 times the weight of the negative active material layer.

In some embodiments, the positive active material layer may have a coating on its surface, or may be mixed with another compound having a coating. The coating may include at least one compound of a coating element, which is selected from: an oxide of a coating element, a hydroxide of a coating element, an oxyhydroxide of a coating element, an oxycarbonate of a coating element, and a hydroxycarbonate of a coating element. The compound used for the coating may be amorphous or crystalline. The coating element included in the coating may include Mg, Al, Co, K, Na, Ca, Si, Ti, V, Sn, Ge, Ga, B, As, Zr, or F, or a mixture thereof. The coating may be applied in any method as long as the method does not adversely affect performance of the positive active material. For example, the method may include any coating method well known to a person of ordinary skill in the art, such as spraying and infiltrating.

In some implementation solutions, the positive active material layer further includes a binder, and optionally, further includes a positive electrode conductive material.

The binder improves bonding between particles of the positive active material and bonding between the positive active material and the current collector. Examples of the binder include, but are not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

The positive active material layer includes a positive electrode conductive material, thereby making the electrode electrically conductive. The positive conductive material may include any conductive material so long as the conductive material does not cause a chemical change. Examples of the positive conductive material include, but are not limited to, a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

The positive current collector used for the electrochemical device according to this application may be, but is not limited to, aluminum (Al).

Electrolyte

The electrolyteapplicable to the embodiments of this application may be an electrolyteknown in the prior art.

The electrolyte applicable to the electrolyte according to the embodiments of this application may be but is not limited to: inorganic lithium salt, for example, $LiClO_4$, $LiAsF_6$, $LiPF_6$, $LiBF_4$, $LiSbF_6$, $LiSO_3F$, and $LiN(FSO_2)_2$; fluorine-containing organic lithium salt, for example, $LiCF_3SO_3$, $LiN(FSO_2)(CF_3SO_2)$, $LiN(CF_3SO_2)_2$, $LiN(C_2F_5SO_2)_2$, cyclic 1,3-hexafluoropropane disulfonimide lithium, cyclic 1,2-tetrafluoroethane disulfonimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and lithium salt containing a dicarboxylic acid coordination complex, for example, lithium bis(oxalate) borate, lithium difluoro(oxalate) borate, lithium tris(oxalate) phosphate, lithium difluorobis(oxalate) phosphate, and lithium tetrafluoro(oxalate) phosphate. In addition, a single one of the foregoing electrolytes may be used separately, or two or more thereof may be used simultaneously. In some embodiments, the electrolyte includes a combination of $LiPF_6$ and $LiBF_4$. In some embodiments, the electrolyte includes a combination of an inorganic lithium salt such as $LiPF_6$ or $LiBF_4$ and a fluorine-containing organic lithium salt such as $LiCF_3SO_3$, $LiN(CF_3SO_2)_2$, and $LiN(C_2F_5SO_2)_2$. In some embodiments, the electrolyte includes $LiPF_6$.

In some embodiments, a concentration of the electrolyte is within a range of 0.8 mol/L to 3 mol/L, for example, within a range of 0.8 mol/L to 2.5 mol/L, within a range of 0.8 mol/L to 2 mol/L, within a range of 1 mol/L to 2 mol/L, or, for another example, the concentration of the electrolyte is 1 mol/L, 1.15 mol/L, 1.2 mol/L, 1.5 mol/L, 2 mol/L, or 2.5 mol/L.

Solvents suitable for use in the electrolyte according to the embodiments of this application include, but are not limited to, cyclic carbonate, chain carbonate, cyclic carboxylate, chain carboxylate, cyclic ether, chain ether, a phosphorus-containing organic solvent, a sulfur-containing organic solvent, and an aromatic fluorine-containing solvent.

In some embodiments, the cyclic carbonate includes, but is not limited to, ethylene carbonate (ethylene carbonate, EC), propylene carbonate (propylene carbonate, PC), and butylene carbonate.

In some embodiments, the cyclic carbonate contains 3 to 6 carbon atoms.

In some embodiments, the chain carbonate includes, but is not limited to, chain carbonate such as dimethyl carbonate, ethyl methyl carbonate, diethyl carbonate (DEC), methyl n-propyl carbonate, ethyl n-propyl carbonate, and di-n-propyl carbonate; and fluorine-substituted chain carbonate, such as bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

In some embodiments, the cyclic carboxylate includes but is not limited to gamma-butyrolactone and gamma-valerolactone. In some embodiments, a part of hydrogen atoms of the cyclic carboxylate may be substituted by fluorine.

In some embodiments, the chain carboxylate includes, but is not limited to, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, a part of hydrogen atoms of the chain carboxylate may be substituted by fluorine. In some embodiments, the fluorine-substituted chain carboxylate includes, but is not limited to, methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyl tetrahydrofuran, 1,3-dioxolane, 2-methyl 1,3-dioxolane, 4-methyl 1,3-dioxolane, 1,3-dioxane, 1,4-dioxane, and dimethoxypropane.

In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the phosphorus-containing organic solvent includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3)-pentafluoropropyl) phosphate.

In some embodiments, the sulfur-containing organic solvent includes, but is not limited to, sulfolane, 2-methyl sulfolane, 3-methyl sulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, a part of hydrogen atoms of the sulfur-containing organic solvent may be substituted by fluorine.

In some embodiments, the aromatic fluorine-containing solvent includes, but is not limited to, fluorobenzene, difluorobenzene, trifluorobenzene, tetrafluorobenzene, pentafluorobenzene, hexafluorobenzene, and trifluoromethylbenzene.

In some embodiments, the solvent used in the electrolyte according to this application includes one or more of the foregoing. In some embodiments, the solvent used in the electrolyte according to this application includes cyclic carbonate, chain carbonate, cyclic carboxylate, chain carboxylate, and any combination thereof. In some embodiments, the solvent used in the electrolyte according to this application includes an organic solvent selected from groups consisting of any of: ethylene carbonate, propylene carbonate, diethyl carbonate, ethyl propionate, propyl propionate, n-propyl acetate, ethyl acetate, and any combination thereof. In some embodiments, the solvent used in the electrolyte according to this application includes: ethylene carbonate, propylene carbonate, diethyl carbonate, ethyl propionate, propyl propionate, gamma-butyrolactone, or any combination thereof.

Additives applicable to the electrolyte according to the embodiments of this application include, but are not limited to, cyclic carbonate containing a carbon-carbon double bond, and a compound containing a sulfur-oxygen double bond.

In some embodiments, the cyclic carbonate containing a carbon-carbon double bond specifically includes, but is not limited to at least one of: vinylene carbonate, methyl vinylene carbonate, ethyl vinylene carbonate, vinyl ethylene carbonate, or 1,2-dimethyl vinylene carbonate.

In some embodiments, the compound containing a sulfur-oxygen double bond includes, but is not limited to at least one of: vinyl sulfate, 1,2-propylene glycol sulfate, 1,3-propane sultone, 1-fluoro-1,3-propane sultone, 2-fluoro-1,3-propane sultone, or 3-fluoro-1,3-propane sultone.

Separator

In some implementation solutions, a separator is disposed between the positive electrode and the negative electrode to prevent a short circuit. The material and the shape of the separator applicable to the embodiments of this application are not particularly limited, and may be based on any technology disclosed in the prior art. In some implementation solutions, the separator includes a polymer or an inorganic compound or the like formed from a material that is stable to the electrolyte according to this application.

For example, the separator may include a substrate layer and a surface treatment layer. The substrate layer is a non-woven fabric, film or composite film, which, in each case, have a porous structure. The material of the substrate layer is selected from at least one of polyethylene, polypropylene, polyethylene terephthalate, and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film. The porous structure can improve heat resistance, oxidation resistance, and electrolyte infiltration performance of the separator, and enhance adhesivity between the separator and the electrode plate.

A surface treatment layer is disposed on at least one surface of the substrate layer. The surface treatment layer may be a polymer layer or an inorganic compound layer, or a layer formed by mixing a polymer and an inorganic compound.

The inorganic compound layer includes inorganic particles and a binder. The inorganic particles are selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder is selected from a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene.

The polymer layer includes a polymer, and the material of the polymer is selected from at least one of a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

Electrochemical Device

This application further provides an electrochemical device, including a positive electrode, an electrolytic solution, and a negative electrode. The positive electrode includes a positive active material layer and a positive current collector. The negative electrode includes a negative active material layer and a negative current collector. The negative active material layer includes the negative active material according to this application.

The electrochemical device according to this application includes any device in which an electrochemical reaction occurs. Specific examples of the electrochemical device include all kinds of primary batteries, secondary batteries, fuel batteries, solar batteries, or capacitors. In particular, the electrochemical device is a lithium secondary battery, including a lithium metal secondary battery, a lithium-ion secondary battery, a lithium polymer secondary battery, or a lithium-ion polymer secondary battery.

Electronic Device

Another aspect of this application provides an electronic device, including the electrochemical device according to this application.

The uses of the electrochemical device according to this application are not particularly limited, and the electrochemical device may be used in any electronic device known in the prior art. In some implementation solutions, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes preparation of a lithium-ion battery as an example with reference to specific embodiments. A person skilled in the art understands that the preparation method described in this application are merely examples. Any other appropriate preparation methods fall within the scope of this application.

Embodiments

The following describes performance evaluation of the lithium-ion batteries according to the embodiments and comparative embodiments of this application.

I. Preparing a Lithium-Ion Battery

1. Preparing a Negative Electrode

Selecting at least one of needle coke, petroleum coke, or pitch coke, crushing the coke into particles by using a mechanical mill or a roller mill, grading the coke according to the surface mean diameter, and shaping the particles by using a shaping machine so as to control an average particle size and a volume-specific surface area of the particles. Adding graded and shaped aggregate and accessories (asphalt, resin, and the like) at a mass ratio of 9:1 to 5:5 into a vertical vessel, a horizontal vessel, or a drum furnace for granulating, performing further grading and shaping on the granulated sample, and obtaining graphite of different surface mean diameters, different distributions, and different volume-specific surface areas Sv by controlling the frequency of a grading out-feed port and the shaping power.

Stirring and mixing the prepared negative active material, styrene butadiene rubber (SBR), and sodium carboxymethyl cellulose (CMC) at a ratio of 97.7:1.2:1.1 in an appropriate amount of deionized water thoroughly to form a homogeneous negative slurry. Coating the negative current collector (copper foil) with the negative slurry, performing drying and cold calendering to obtain a negative active material layer, and performing cutting and slitting to obtain a negative electrode.

2. Preparing a Positive Electrode

Stirring and mixing lithium cobalt oxide ($LiCoO_2$), acetylene black, and polyvinylidene fluoride (PVDF) at a mass ratio of 97:1:2 in an appropriate amount of N-methylpyrrolidone (NMP) thoroughly to form a homogeneous positive slurry. Coating a positive current collector aluminum foil with the slurry, performing drying and cold calendering to obtain a positive active material layer, and performing cutting and slitting to obtain a positive electrode.

3. Preparing an Electrolytic Solution

Mixing ethylene carbonate (EC), ethyl methyl carbonate (EMC), and diethyl carbonate (DEC) in a dry argon atmosphere glovebox at a mass ratio of EC:EMC:DEC=30:50:20, adding 4 wt % fluoroethylene carbonate, 2 wt % 1,3-propane sultone, and 2 wt % succinonitrile, dissolving and thoroughly stirring the mixture, and then adding lithium salt $LiPF_6$, and mixing the mixture evenly to obtain an electrolytic solution, in which a concentration of $LiPF_6$ is 1 mol/L.

4. Preparing a Separator

Using a 6 μm polyethylene (PE) porous polymer film as a separator coated with an organic polymer protection layer, where the organic polymer protection layer is approximately 1 to 3 μm thick and contains PVDF.

5. Preparing a Lithium-Ion Battery

Stacking the positive electrode, the separator, and the negative electrode sequentially, placing the separator between positive electrode and the negative electrode to serve a separation function, and winding them to obtain a bare cell; welding tabs and then putting the bare cell into an outer package made of an aluminum laminated film foil, and injecting the prepared electrolyte into the dried bare cell, and performing steps such as vacuum packaging, standing, chemical formation, reshaping, and capacity test to obtain a lithium-ion battery.

II. Test Methods

1. Test Method of the Surface Mean Diameter and the Volume-Specific Surface Area of the Negative Active Material Operating a Simpatec QICPIC dynamic particle image analyzer, placing a to-be-tested sample of the negative active material into a powerful dry dispersion unit, dispersing the sample into individual particles thoroughly, and obtaining a clearly edged image of the particle in an exposure time of less than 1 nanosecond by using a high-frequency pulsed light source. Obtaining 450 images per second through a high-speed imaging system. Analyzing left and right images to obtain the surface mean diameter and the volume-specific surface area of the negative active material, recording and calculating the quantity of SMD, lg(SMD−2)+lg(SMD+2) and Sv.

2. Test Method of the Direct-Current Resistance (DCR) of the Lithium-Ion Battery Charging the lithium-ion battery at a constant current of 1.5C at a temperature of 25° C. until the voltage reaches 4.45 V, then charging the battery at a constant voltage of 4.45 V until the current reaches 0.05C, and then leaving the battery to stand for 5 minutes. Then, discharging the battery at a current of 0.1C for 10 seconds, and recording the voltage value U1; and then discharging the battery at a current of 1C for 360 seconds, and recording the voltage value U2, where "1C" is a current value at which the capacity of the battery can be fully discharged within 1 hour.

Calculating the direct-current resistance (DCR) of the lithium-ion battery according to the following formula:

$$R=(U2-U1)/(1C-0.1C).$$

Unless otherwise specified, the DCR referred to herein is obtained by testing the lithium-ion battery in a 10% state of charge (SOC).

3. Test Method of the Lithium Plating of the Lithium-Ion Battery (1) Testing by Observing Discharging the lithium-ion battery at a constant current of 0.5C and at a temperature of 25° C. until the voltage reaches 3.0 V, and leaving the battery to stand for 10 minutes. Charging the battery at a constant current of 1.5C until the voltage reaches 4.1 V, charging the battery at a constant voltage of 4.1 V until the current reaches 0.05C, charging the battery at a constant current of 0.7C until the voltage reaches 4.3 V, charging the battery at a constant voltage of 4.3 V until the current reaches 0.05C, charging the battery at a constant current of 0.5C until the voltage reaches 4.4 V, charging the battery at a constant voltage of 4.4 V until the current reaches 0.05C, and finally, discharging the battery at a constant current of 0.5C until the voltage reaches 3.0 V, and leaving the battery to stand for 10 minutes. Repeating the foregoing charge and discharge processes for 10 cycles. Disassembling the battery under dry conditions, taking photos to record the status of the negative electrode. Determining a Lithium Plating Degree of the Lithium-Ion Battery According to the Following Criteria:

When the negative electrode of the disassembled battery exhibits a golden yellow color as a whole, gray is seen in very few positions of the negative electrode, and the area of the gray region accounts for less than 2%, it is determined that no lithium plating occurs.

When the negative electrode of the disassembled battery mostly exhibits a golden yellow color, gray is seen in some positions of the negative electrode, and the area of the gray region accounts for 2% to 20%, it is determined that slight lithium plating occurs.

When the negative electrode of the disassembled battery exhibits a gray color as a whole, golden yellow is seen in some positions of the negative electrode, and the area of the gray region accounts for 20% to 60%, it is determined that lithium plating occurs.

When the negative electrode of the disassembled battery exhibits a gray color as a whole, and the area of the gray region accounts for more than 60%, it is determined that severe lithium plating occurs.

(2) Testing by Calculating

Performing a charge and discharge test on the lithium-ion battery according to the following steps:

(a) charging the lithium-ion battery at a direct current of 3C until a state of charge of 100%;

(b) after step (a), discharging the lithium-ion battery at a direct current of 1C until a voltage of 3 V, and staying for 5 minutes;

(c) after step (b), discharging the lithium-ion battery at a direct current of 0.5C until a voltage of 3 V, and staying for 5 minutes;

(d) after step (c), discharging the lithium-ion battery at a direct current of 0.05C until a voltage of 3 V, and staying for 5 minutes;

(e) after step (d), discharging the lithium-ion battery at a direct current of 0.005C until a voltage of 3 V, and staying for 5 minutes; and (f) repeating steps (a) to (e) 10 times.

The capacity of the lithium-ion battery after step (a) in the $1^{st}$ charge and discharge test is recorded as C1; the sum of capacities of the lithium-ion battery after steps (b), (c), (d), and (e) in the $1^{st}$ charge and discharge test is recorded as D1; and the sum of the capacities of the lithium-ion battery after steps (b), (c), (d) and (e) in the $10^{th}$ charge and discharge test is recorded as D10. D10/D1 and (C1−D10)/C1 are calculated to determine the degree of lithium plating of the lithium-ion battery.

4. Test Method of the Volumetric Energy Density of the Lithium-Ion Battery

Charging the lithium-ion battery at a constant current of 0.5C at a temperature of 25° C. until a voltage of 4.45 V by using a Neware battery tester, charging the battery at a constant voltage until a current of 0.05C, leaving the battery to stand for 5 minutes, and then discharging the battery at a constant current of 0.5C until a voltage of 3.0 V, and recording a discharge capacity and a discharge plateau. Measuring the volume of the lithium-ion battery by using a drainage method. Calculating the volumetric energy density of the lithium-ion battery according to the following formula:

$$\text{Volumetric energy density}=\frac{\text{capacity}\times\text{discharge platform}}{\text{volume of lithium ion battery}}\times 100\%$$

5. Test Method of the Quantity of Cycles of the Lithium-Ion Battery

Putting the lithium-ion battery into a 25° C. thermostat, and leaving the battery to stand for 30 minutes so that the temperature of the lithium-ion battery is constant. Charging the battery at a constant current of 0.7C until a voltage of 4.45 V, charging the battery at a constant voltage until a current of 0.05C, and discharging the battery at a current of 0.7C until a voltage of 3.0 V, and recording the capacity of the lithium-ion battery at this time as an initial capacity. Cycling the lithium-ion battery according to the same steps until the capacity of the lithium-ion battery is 80% of the initial capacity, and recording the quantity of cycles.

III. Test Results

Table 1 shows the impact exerted by the characteristics of the negative active material on the performance of the lithium-ion battery. In Embodiments 1 to 9, the areal density is approximately 0.10 $mg/mm^2$, the compacted density is approximately 1.75 $g/cm^3$, the C004/C110 ratio is approximately 11, and the porosity is approximately 27%.

The test results show that the degree of lithium plating tested by calculating D10/D1 and (C1−D10)/C1 is identical to the degree of lithium plating tested by observing. Specifically, as shown in Embodiments 1 to 9, when D10/D1≥95% and (C1−D10)/C1≤7%, the lithium-ion battery is free from lithium plating. As shown in Comparative Embodiment 2, when D10/D1≥95% and (C1−D10)/C1<7%, the lithium-ion battery incurs lithium plating. As shown in Comparative Embodiments 3 and 4, when D10/D1<95% and (C1−D10)/C1<7%, the lithium-ion battery incurs severe lithium plating. Testing the lithium plating by calculating D10/D1 and (C1−D10)/C1 provides a quantitative means for determining the degree of lithium plating of the lithium-ion battery. The calculation can more precisely determine the degree of lithium plating of the lithium-ion battery, and avoid subjective errors caused by different observers in the observation-based testing and the errors caused by a restricted field of view.

As shown in Comparative Embodiment 1, the SMD of the negative active material is less than 10 μm but lg(SMD−2)+lg(SMD+2) is less than 0.4. The direct current resistance (DCR) of the lithium-ion battery is relatively low and no lithium plating occurs, but the volumetric energy density of the lithium-ion battery is relatively low. As shown in Comparative Embodiment 2, the negative active material satisfies lg(SMD−2)+lg(SMD+2)≥0.4 but the SMD is less than 10 The direct current resistance (DCR) of the lithium-ion battery is relatively small, but lithium plating occurs, and the volumetric energy density is relatively low. As shown in Comparative Embodiment 3, the negative active material satisfies lg(SMD−2)+lg(SMD+2)≥0.4 but the SMD is greater than 16 μm (as shown in Comparative Embodiment 3 in FIGURE). The volumetric energy density of the lithium-ion battery is relatively high, but severe lithium plating occurs, and the direct current resistance (DCR) is relatively high. As shown in Comparative Embodiment 4, the SMD of the negative active material is greater than 16 μm and lg(SMD−2)+lg(SMD+2) is less than 0.4. The volumetric energy density of the lithium-ion battery is relatively high, but severe lithium plating occurs and the direct current resistance (DCR) is relatively high.

As shown in Embodiments 1 to 9, when the negative active material satisfies lg(SMD−2)+lg(SMD+2)≥0.4 and the SMD falls within a range of 10 μm to 16 μm (for example, as shown in Embodiment 3 in FIGURE), the lithium-ion battery not only possesses a relatively low direct-current resistance (DCR) without lithium plating, but also possesses a relatively high energy density and achieves a trade-off between the degree of lithium plating and the energy density. The smaller the surface mean diameter SMD of the negative active material, the lower the direct-current resistance (DCR) of the lithium-ion battery, and the lower the degree of lithium plating. When the volumetric surface area Sv of the negative active material is less than or equal to 0.3 $m^2/cm^3$, the direct-current resistance (DCR) of the lithium-ion battery can be further reduced and the volumetric energy density of the lithium-ion battery can be further enhanced.

Table 2 shows how the characteristics of the negative active material affects the performance of the lithium-ion battery, in which Embodiments 10 to 28 are similar to Embodiment 5 but differ merely in the parameters set out in Table 2.

The test results show that when the areal density of the negative active material layer falls within the range of 0.077 $mg/mm^2$ to 0.121 $mg/mm^2$ and/or the compacted density falls within the range of 1.20 $g/cm^3$ to 1.83 $g/cm^3$, a trade-off between the degree of lithium plating and the volumetric energy density of the lithium-ion battery is facilitated, and excellent processing performance of the negative active material layer can be maintained.

When the C004/C110 ratio of the negative active material layer falls within the range of 5 to 15, the orientation of the negative active material falls within an appropriate range, and the amount of an end face (that is, a plane in which the C axis of the graphite crystal is located) falls within an appropriate range, lithium plating and expansion of the negative electrode are avoided, the negative active material layer is prevented from peeling off from the negative current collector, and the lithium-ion battery possesses a relatively high volumetric energy density.

When the bonding force between the negative active material layer and the negative current collector is 8 N/m to 14 N/m and/or the negative active material layer possesses a porosity of 20% to 40%, the trade-off between the degree of lithium plating and the volumetric energy density of the lithium-ion battery is facilitated.

TABLE 1

| | SMD (μm) | lg(SMD − 2) + lg(SMD + 2) | Sv ($m^2/cm^3$) | DCR (mΩ) | Lithium plating D10/D1 | Lithium plating (C1 − D10)/C1 | Lithium plating Observation result | Volumetric energy density (wh/L) |
|---|---|---|---|---|---|---|---|---|
| Embodiment 1 | 10 | 0.4 | 0.3 | 23 | 97.0% | 4.0% | No lithium plating | 655 |
| Embodiment 2 | 12 | 0.4 | 0.3 | 25 | 96.8% | 4.1% | No lithium plating | 657 |
| Embodiment 3 | 14 | 0.4 | 0.3 | 27 | 96.2% | 4.7% | No lithium plating | 660 |

TABLE 1-continued

| | SMD (μm) | lg(SMD − 2) + lg(SMD + 2) | Sv ($m^2/cm^3$) | DCR (mΩ) | Lithium plating D10/D1 | Lithium plating (C1 − D10)/C1 | Lithium plating Observation result | Volumetric energy density (wh/L) |
|---|---|---|---|---|---|---|---|---|
| Embodiment 4 | 16 | 0.4 | 0.3 | 30 | 96.5% | 5.0% | No lithium plating | 663 |
| Embodiment 5 | 10 | 0.5 | 0.3 | 22 | 97.5% | 3.5% | No lithium plating | 653 |
| Embodiment 6 | 10 | 0.5 | 0.2 | 21 | 98.0% | 3.0% | No lithium plating | 650 |
| Embodiment 7 | 14 | 0.6 | 0.2 | 28 | 96.5% | 4.2% | No lithium plating | 661 |
| Embodiment 8 | 10 | 0.6 | 0.3 | 24 | 97.5% | 3.5% | No lithium plating | 656 |
| Embodiment 9 | 10 | 0.4 | 0.4 | 28 | 96.5% | 4.5% | No lithium plating | 654 |
| Comparative Embodiment 1 | 6 | 0.3 | 0.4 | 20 | 98.0% | 4.0% | No lithium plating | 630 |
| Comparative Embodiment 2 | 8 | 0.4 | 0.3 | 22 | 97.5% | 7.5% | Lithium plating | 635 |
| Comparative Embodiment 3 | 18 | 0.4 | 0.5 | 65 | 89.0% | 12.0% | Severe lithium plating | 654 |
| Comparative Embodiment 4 | 20 | 0.3 | 0.6 | 72 | 83.0% | 18.0% | Severe lithium plating | 656 |

TABLE 2

| | Areal density ($mg/mm^2$) | Compacted density ($g/cm^3$) | C004/C110 | Porosity (%) | Bonding force (N/m) | DCR (mΩ) | Lithium plating D10/D1 | Lithium plating (C1 − D10)/C1 | Lithium plating Observation result | Volumetric energy density (wh/L) | Quantity of cycles |
|---|---|---|---|---|---|---|---|---|---|---|---|
| Embodiment 5 | 0.105 | 1.75 | 11 | 27 | 12 | 21 | 97.50% | 3.50% | No lithium plating | 653 | 1050 |
| Embodiment 10 | 0.077 | 1.75 | 11 | 27 | 10 | 20 | 98.00% | 3.00% | No lithium plating | 640 | 1100 |
| Embodiment 11 | 0.095 | 1.75 | 11 | 27 | 11 | 22 | 97.00% | 4.00% | No lithium plating | 650 | 1050 |
| Embodiment 12 | 0.115 | 1.75 | 11 | 27 | 13 | 26 | 95.00% | 6.00% | No lithium plating | 660 | 1000 |
| Embodiment 13 | 0.135 | 1.75 | 11 | 27 | 14 | 65 | 89.00% | 12.00% | Slight lithium plating | 670 | 900 |
| Embodiment 14 | 0.118 | 1.10 | 11 | 45 | 8 | 18 | 99.00% | 2.00% | No lithium plating | 600 | 1200 |
| Embodiment 15 | 0.118 | 1.30 | 11 | 36 | 9 | 19 | 98.50% | 2.50% | No lithium plating | 610 | 1150 |
| Embodiment 16 | 0.115 | 1.60 | 11 | 31 | 10 | 20 | 98.00% | 3.00% | No lithium plating | 640 | 1100 |
| Embodiment 17 | 0.115 | 1.75 | 4 | 27 | 7 | 20 | 98.00% | 3.00% | No lithium plating | 648 | 500 |
| Embodiment 18 | 0.115 | 1.75 | 5 | 27 | 7 | 21 | 97.50% | 3.50% | No lithium plating | 653 | 1050 |
| Embodiment 19 | 0.115 | 1.75 | 6 | 27 | 8 | 22 | 97.00% | 4.00% | No lithium plating | 650 | 1050 |
| Embodiment 20 | 0.115 | 1.75 | 9 | 27 | 9 | 24 | 96.00% | 5.00% | No lithium plating | 655 | 1050 |
| Embodiment 21 | 0.115 | 1.75 | 11 | 27 | 11 | 26 | 95.00% | 6.00% | No lithium plating | 660 | 1000 |
| Embodiment 22 | 0.115 | 1.75 | 14 | 27 | 13 | 30 | 95.00% | 6.00% | No lithium plating | 665 | 950 |
| Embodiment 23 | 0.115 | 1.75 | 15 | 27 | 13 | 28 | 95.50% | 5.50% | No lithium plating | 658 | 1050 |
| Embodiment 24 | 0.115 | 1.75 | 18 | 27 | 14 | 40 | 94.00% | 7.00% | Slight lithium plating | 670 | 900 |

TABLE 2-continued

| | Areal density ($mg/mm^2$) | Compacted density ($g/cm^3$) | C004/C110 | Porosity (%) | Bonding force (N/m) | DCR (mΩ) | Lithium plating D10/D1 | Lithium plating (C1 − D10)/C1 | Lithium plating Observation result | Volumetric energy density (wh/L) | Quantity of cycles |
|---|---|---|---|---|---|---|---|---|---|---|---|
| Embodiment 25 | 0.065 | 1.75 | 11 | 27 | 9 | 18 | 99.00% | 2.00% | No lithium plating | 595 | 1200 |
| Embodiment 26 | 0.121 | 1.75 | 11 | 27 | 11 | 28 | 95.00% | 6.00% | No lithium plating | 665 | 1000 |
| Embodiment 27 | 0.105 | 1.20 | 11 | 40 | 9 | 19 | 98.50% | 2.50% | No lithium plating | 605 | 1150 |
| Embodiment 28 | 0.105 | 1.83 | 11 | 20 | 14 | 40 | 94.00% | 7.00% | Slight lithium plating | 670 | 900 |

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. A negative active material, wherein the negative active material comprises at least one selected from the group consisting of needle coke, petroleum coke, and pitch coke;

wherein a surface mean diameter of the negative active material satisfies: lg(SMD−2)+lg(SMD+2)≥0.4, wherein SMD is a value of the surface mean diameter of the negative active material in μm, and falls within a range of 10 to 16; and lg represents a frequency corresponding to a given surface mean diameter on a surface mean diameter distribution curve of the negative active material, wherein the frequency is defined as a density distribution (93) value of the negative active material at the given surface mean diameter;

wherein the surface mean diameter (SMD) of the negative active material is defined as a ratio of a total volume of all negative active material particles to a total area of all the negative active material particles, and is represented by the following formula:

$$SMD = \frac{\sum N_i D_i^3}{\sum N_i D_i^2}$$

where i represents an ordinal number, $D_i$ represents a diameter of a corresponding negative active material particle, and $N_i$ represents a quantity of particles with a diameter of $D_i$;

wherein a volume-specific surface area Sv of the negative active material is less than or equal to 0.3 $m^2/cm^3$.

2. An electrochemical device, comprising a positive electrode, an electrolyte, and a negative electrode; wherein the negative electrode comprises a negative active material layer and a negative current collector, and the negative active material layer comprises the negative active material, wherein the negative active material comprises at least one selected from the group consisting of needle coke, petroleum coke, and pitch coke;

wherein a surface mean diameter of the negative active material satisfies: lg(SMD−2)+lg(SMD+2)≥0.4, wherein SMD is a value of the surface mean diameter of the negative active material in μm, and falls within a range of 10 to 16; and lg represents a frequency corresponding to a given surface mean diameter on a surface mean diameter distribution curve of the negative active material, wherein the frequency is defined as a density distribution (q3) value of the negative active material at the given surface mean diameter;

wherein the surface mean diameter (SMD) of the negative active material is defined as a ratio of a total volume of all negative active material particles to a total area of all the negative active material particles, and is represented by the following formula:

$$SMD = \frac{\sum N_i D_i^3}{\sum N_i D_i^2}$$

where i represents an ordinal number, $D_i$ represents a diameter of a corresponding negative active material particle, and $N_i$ represents a quantity of particles with a diameter of $D_i$;

wherein a volume-specific surface area Sv of the negative active material is less than or equal to 0.3 $m^2/cm^3$;

wherein a porosity of the negative active material layer is 20% to 40%.

3. The electrochemical device according to claim 2, wherein an areal density of the negative active material layer is 0.077 $mg/mm^2$ to 0.121 $mg/mm^2$.

4. The electrochemical device according to claim 2, wherein a compacted density of the negative active material layer is 1.20 $g/cm^3$ to 1.83 $g/cm^3$ when the electrochemical device is in a 50% SOC state.

5. The electrochemical device according to claim 2, wherein as measured by an X-ray diffraction pattern, a ratio C004/C110 is within a range of 5 to 15, C004 is a peak area of a (004) surface of the negative active material layer, C110 is a peak area of a (110) surface of the negative active material layer.

6. The electrochemical device according to claim 2, wherein a bonding force between the negative active material layer and the negative current collector is 8 N/m to 14 N/m.

7. The electrochemical device according to claim 2, wherein the electrochemical device satisfies the following relationship as measured in a charge and discharge test:

$$D10/D1 \geq 95\%; \text{ and}$$

$$(C1 - D10)/C1 \leq 7\%$$

wherein the charge and discharge test is performed according to the following steps:

(a) charging the electrochemical device at a direct current of 3C until a 100% state of charge, and recording a charge capacity;

(b) after step (a), discharging the electrochemical device at a direct current of 1C until a voltage of 3 V, recording a discharge capacity, and staying for 5 minutes;

(c) after step (b), discharging the electrochemical device at a direct current of 0.5C until the voltage of 3 V, recording a discharge capacity, and staying for 5 minutes;

(d) after step (c), discharging the electrochemical device at a direct current of 0.05C until the voltage of 3 V, recording a discharge capacity, and staying for 5 minutes;

(e) after step (d), discharging the electrochemical device at a direct current of 0.005C until the voltage of 3 V, recording a discharge capacity, and staying for 5 minutes; and (f) repeating steps (a) to (e) 10 times; and C1 is a capacity of the electrochemical device after step (a) in a $1^{st}$ charge and discharge test;

D1 is a sum of capacities of the electrochemical device after steps (b), (c), (d), and (e) in the $1^{st}$ charge and discharge test; and D10 is a sum of capacities of the electrochemical device after steps (b), (c), (d), and (e) in a $10^{th}$ charge and discharge test.

8. An electronic device, comprising an electrochemical; the electrochemical device, comprising a positive electrode, an electrolyte, and a negative electrode; wherein the negative electrode comprises a negative active material layer and a negative current collector, and the negative active material layer comprises the negative active material, wherein the negative active material comprises at least one selected from the group consisting of needle coke, petroleum coke, and pitch coke;

wherein a surface mean diameter of the negative active material satisfies: lg(SMD−2)+lg(SMD+2)≥0.4, wherein SMD is a value of the surface mean diameter of the negative active material in μm, and falls within a range of 10 to 16; and lg represents a frequency corresponding to a given surface mean diameter on a surface mean diameter distribution curve of the negative active material, wherein the frequency is defined as a density distribution (q3) value of the negative active material at the given surface mean diameter;

wherein the surface mean diameter (SMD) of the negative active material is defined as a ratio of a total volume of all negative active material particles to a total area of all the negative active material particles, and is represented by the following formula:

$$SMD = \frac{\sum N_i D_i^3}{\sum N_i D_i^2}$$

where i represents an ordinal number, $D_i$ represents a diameter of a corresponding negative active material particle, and $N_i$ represents a quantity of particles with a diameter of $D_i$;

wherein a volume-specific surface area Sv of the negative active material is less than or equal to 0.3 $m^2/cm^3$;

wherein a porosity of the negative active material layer is 20% to 40%.

9. The electronic device according to claim 8, wherein an areal density of the negative active material layer is 0.077 $mg/mm^2$ to 0.121 $mg/mm^2$.

10. The electronic device according to claim 8, wherein a compacted density of the negative active material layer is 1.20 $g/cm^3$ to 1.83 $g/cm^3$ when the electrochemical device is in a 50% SOC state.

11. The electronic device according to claim 8, wherein as measured by an X-ray diffraction pattern, a ratio C004/C110 is within a range of 5 to 15, C004 is a peak area of a (004) surface of the negative active material layer, C110 is a peak area of a (110) surface of the negative active material layer.

* * * * *